United States Patent
Wang et al.

(10) Patent No.: US 12,211,381 B2
(45) Date of Patent: Jan. 28, 2025

(54) METHOD AND APPARATUS FOR PROMPTING NAVIGATION INFORMATION, AND MEDIUM

(71) Applicant: BEIJING BAIDU NETCOM SCIENCE TECHNOLOGY CO., LTD., Beijing (CN)

(72) Inventors: Yuzhe Wang, Beijing (CN); Jiantao Zhao, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/727,390

(22) Filed: Apr. 22, 2022

(65) Prior Publication Data

US 2022/0246032 A1    Aug. 4, 2022

(30) Foreign Application Priority Data

Sep. 30, 2021    (CN) ............... 202111158962.6

(51) Int. Cl.
    *G08G 1/123*    (2006.01)
(52) U.S. Cl.
    CPC .................. *G08G 1/123* (2013.01)
(58) Field of Classification Search
    CPC .................. G08G 1/123
    See application file for complete search history.

(56) References Cited

U.S. PATENT DOCUMENTS

| | | | | |
|---|---|---|---|---|
| 8,041,312 | B2 * | 10/2011 | Endo | G01C 21/3608 |
| | | | | 379/88.01 |
| 8,400,294 | B2 * | 3/2013 | Bishop | G08G 1/005 |
| | | | | 340/539.11 |

(Continued)

FOREIGN PATENT DOCUMENTS

| | | | | |
|---|---|---|---|---|
| CN | 111405478 A | * | 7/2020 | G06F 16/29 |
| CN | 111858812 A | | 10/2020 | |

(Continued)

OTHER PUBLICATIONS

Chinese Patent Application No. 202111158962.6 Office Action dated Jul. 1, 2022, 8 pages.

(Continued)

*Primary Examiner* — Nay Tun
(74) *Attorney, Agent, or Firm* — Cozen O'Connor

(57) ABSTRACT

A method and apparatus for prompting navigation information. The method includes: acquiring, when a user is in an underground vehicle area, traffic behavior statuses of an underground vehicle at stops on a preset navigation route; determining, in response to the traffic behavior status of each stop of adjacent stops on the navigation route being consistent with a first preset traffic behavior status, a base station corresponding to a latter stop in the adjacent stops as a reference station; determining a location of a preset stop on the navigation route, based on a location of the reference station and locations of base stations provided at the stops; and outputting, in response to the traffic behavior status of the underground vehicle at the preset stop being consistent with a second preset traffic behavior status, prompt information for getting off.

18 Claims, 6 Drawing Sheets

(56) References Cited

U.S. PATENT DOCUMENTS

| | | | | |
|---|---|---|---|---|
| 8,560,230 | B2* | 10/2013 | Bell | B61L 27/40 |
| | | | | 701/527 |
| 11,212,649 | B2* | 12/2021 | Ivanov | G01S 5/0027 |
| 11,227,494 | B1* | 1/2022 | Stoyles | G01C 21/3602 |
| 2009/0207049 | A1* | 8/2009 | Liao | G08G 1/123 |
| | | | | 340/988 |
| 2011/0148623 | A1* | 6/2011 | Bishop | G08G 1/005 |
| | | | | 340/669 |
| 2015/0070131 | A1* | 3/2015 | Beaurepaire | H04W 4/021 |
| | | | | 340/5.8 |
| 2016/0094954 | A1* | 3/2016 | Millman | H04W 4/80 |
| | | | | 455/456.2 |
| 2019/0342715 | A1* | 11/2019 | Pylappan | H04W 4/23 |
| 2019/0351919 | A1* | 11/2019 | Hagiwara | B61L 3/125 |
| 2023/0013672 | A1* | 1/2023 | Wang | H01L 27/0266 |

FOREIGN PATENT DOCUMENTS

| | | | |
|---|---|---|---|
| CN | 111967301 A | | 11/2020 |
| CN | 112747761 A | | 5/2021 |
| CN | 113012461 A | | 6/2021 |
| EP | 1 744 291 A1 | | 1/2007 |

OTHER PUBLICATIONS

English translation of Chinese Patent Application No. 202111158962.6 Office Action dated Jul. 1, 2022, 11 pages.

* cited by examiner

400

┌─────────────────────────────────────────────┐
│ In response to a location obtained by a terminal device │
│ performing network positioning at a target stop of an   │ 401
│ underground vehicle, matching from pre-collected base   │
│ stations of the underground vehicle, a base station     │
│ corresponding to the target stop, and determining that a│
│ user is in an underground vehicle area                  │
└─────────────────────────────────────────────┘
                        ↓
┌─────────────────────────────────────────────┐
│ Acquiring, when the user is in the underground vehicle  │ 402
│ area, traffic behavior statuses of the underground vehicle │
│ at stops on a preset navigation route                   │
└─────────────────────────────────────────────┘
                        ↓
┌─────────────────────────────────────────────┐
│ Determining, in response to the traffic behavior status of │
│ each stop of adjacent stops on the navigation route being │ 403
│ consistent with a first preset traffic behavior status, a │
│ base station corresponding to a latter stop in the adjacent │
│ stops as a reference station                            │
└─────────────────────────────────────────────┘
                        ↓
┌─────────────────────────────────────────────┐
│ Determining a location of a preset stop on the navigation │ 404
│ route, based on a location of the reference station and │
│ locations of the base stations provided at the stops    │
└─────────────────────────────────────────────┘
                        ↓
┌─────────────────────────────────────────────┐
│ Outputting, in response to the traffic behavior status of │ 405
│ the underground vehicle at the preset stop being        │
│ consistent with a second preset traffic behavior status,│
│ prompt information for getting off                      │
└─────────────────────────────────────────────┘

Fig. 4

METHOD AND APPARATUS FOR PROMPTING NAVIGATION INFORMATION, AND MEDIUM

CROSS-REFERENCE TO RELATED APPLICATIONS

This patent application claims the priority of Chinese Patent Application No. 202111158962.6, filed on Sep. 30, 2021, and entitled "Method and Apparatus for Prompting Navigation Information, Medium and Program Product", the entire content of which is herein incorporated by reference.

TECHNICAL FIELD

The present disclosure relates to the field of computers, in particular to intelligent transportation and deep learning, and more particularly to a method and apparatus for prompting navigation information, and a medium.

BACKGROUND

Most terminal devices have a positioning function, which can provide users with many location-based services and bring convenience to the users.

At present, the positioning method of the terminal devices includes Global Navigation Satellite System (GNSS) positioning and the like.

SUMMARY

Embodiments of the present disclosure propose a method and apparatus for prompting navigation information, and a medium.

In a first aspect, an embodiment of the present disclosure provides a method for prompting navigation information. The method includes: acquiring, when a user is in an underground vehicle area, traffic behavior statuses of an underground vehicle at stops on a preset navigation route; determining, in response to the traffic behavior status of each stop of adjacent stops on the navigation route being consistent with a first preset traffic behavior status, a base station corresponding to a latter stop in the adjacent stops as a reference station; determining a location of a preset stop on the navigation route, based on a location of the reference station and locations of base stations provided at the stops; and outputting, in response to the traffic behavior status of the underground vehicle at the preset stop being consistent with a second preset traffic behavior status, prompt information for getting off.

In a second aspect, an embodiment of the present disclosure provides an apparatus for prompting navigation information. The apparatus includes: a status acquiring module, configured to acquire, when a user is in an underground vehicle area, traffic behavior statuses of an underground vehicle at stops on a preset navigation route; a first determining module, configured to determine, in response to the traffic behavior status of each stop of adjacent stops on the navigation route being consistent with a first preset traffic behavior status, a base station corresponding to a latter stop in the adjacent stops as a reference station; a second determining module, configured to determine a location of a preset stop on the navigation route, based on a location of the reference station and locations of base stations provided at the stops; and an information outputting module, configured to output, in response to the traffic behavior status of the underground vehicle at the preset stop being consistent with a second preset traffic behavior status, prompt information for getting off.

In a third aspect, an embodiment of the present disclosure provides an electronic device. The electronic device includes: at least one processor; and a memory communicatively connected to the at least one processor. The memory stores instructions executable by the at least one processor, and the instructions, when executed by the at least one processor, cause the at least one processor to perform the method according to the first aspect.

In a fourth aspect, an embodiment of the present disclosure provides a non-transitory computer readable storage medium storing computer instructions. The computer instructions are used to cause the computer to perform the method according to the first aspect.

It should be understood that contents described in this section are neither intended to identify key or important features of embodiments of the present disclosure, nor intended to limit the scope of the present disclosure. Other features of the present disclosure will become readily understood in conjunction with the following description.

BRIEF DESCRIPTION OF THE DRAWINGS

Other features, objectives and advantages of the present disclosure will become more apparent upon reading the detailed description of non-limiting embodiment with reference to the following accompanying drawings. The accompanying drawings are used for better understanding of the present solution and do not constitute a limitation to the present disclosure.

FIG. 4 is a flowchart of the method for prompting navigation information according to an embodiment of the present disclosure;

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
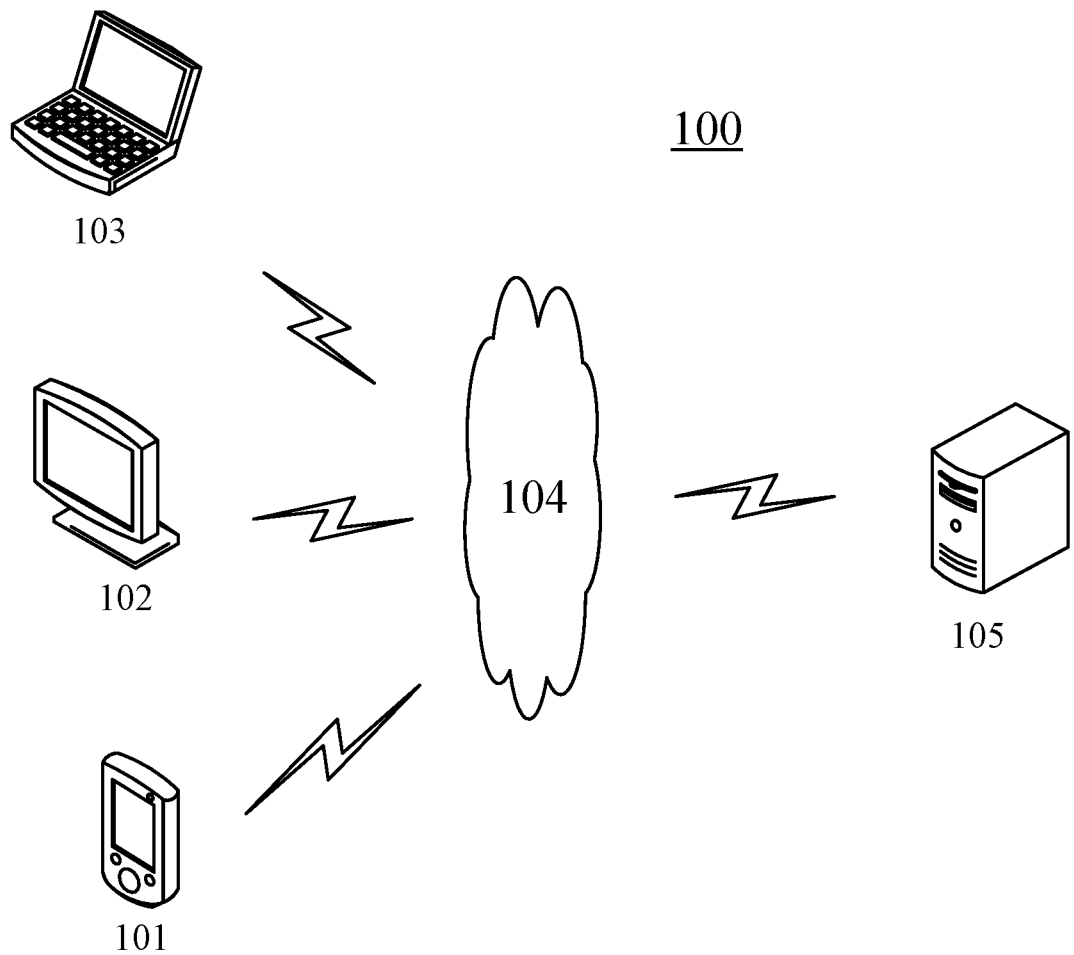
FIG. 1 is an exemplary system architecture diagram to which embodiments of the present disclosure may be applied.

FIG. 1 shows an exemplary system architecture 100 to which a method for prompting navigation information or an apparatus for prompting navigation information of embodiments of the present disclosure may be applied.

As shown in FIG. 1, the system architecture 100 may include terminal devices 101, 102, 103, a network 104 and a server 105. The network 104 serves as a medium for providing a communication link between the terminal devices 101, 102, 103 and the server 105. The network 104 may include various types of connections, such as wired or wireless communication links, or optical fiber cables.

A user may use the terminal devices 101, 102, and 103 to interact with the server 105 through the network 104 to acquire traffic behavior statuses of an underground vehicle at stops on a preset navigation route, and the like. Various client applications and intelligent interactive applications, such as navigation applications, or map applications, may be installed on the terminal devices 101, 102, and 103.

The terminal devices 101, 102, and 103 may be hardware or software. When the terminal devices 101, 102, and 103 are hardware, the terminal devices may be electronic products that perform human-computer interaction with the user through one or more methods such as keyboards, touch pads, touch screens, remote controls, voice interaction or handwriting devices, for example PCs (Personal Computer), mobile phones, smart phones, PDAs (Personal Digital Assistant), wearable devices, PPCs (Pocket PC), tablet computers, smart cars, smart TVs, smart speakers, tablets, laptop computers, desktop computers, and the like. When the terminal devices 101, 102, and 103 are software, they may be installed in the above-mentioned electronic devices. They may be implemented as a plurality of software or software modules, and may also be implemented as a single software or software module, which is not limited herein.

The server 105 may provide various services. For example, the server 105 may acquire, when a user is in an underground vehicle area, traffic behavior statuses of an underground vehicle at stops on a preset navigation route; determine, in response to the traffic behavior status of each stop of adjacent stops on the navigation route being consistent with a first preset traffic behavior status, a base station corresponding to a latter stop in the adjacent stops as a reference station; determine a location of a preset stop on the navigation route, based on a location of the reference station and locations of base stations provided at the stops; and output, in response to the traffic behavior status of the underground vehicle at the preset stop being consistent with a second preset traffic behavior status, prompt information for getting off.

It should be noted that the server 105 may be hardware or software. When the server 105 is hardware, it may be implemented as a distributed server cluster composed of a plurality of servers, or may be implemented as a single server. When the server 105 is software, it may be implemented as a plurality of pieces of software or a plurality of software modules (for example, for providing distributed services), or may be implemented as a single piece of software or a single software module, which is not limited herein.

It should be noted that the method for prompting navigation information provided by the embodiments of the present disclosure is generally executed by the server 105, and accordingly, the apparatus for prompting navigation information is generally provided in the server 105.

It should be appreciated that the number of electronic devices, networks and servers in FIG. 1 is merely illustrative. Any number of electronic devices, networks and servers may be provided depending on the implementation needs.

Figure 2:
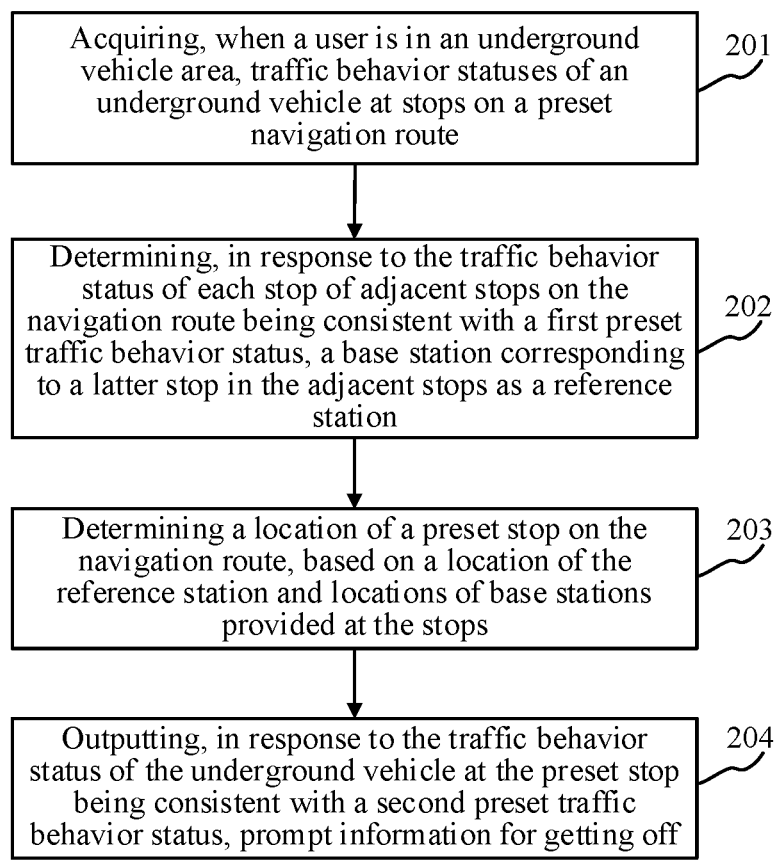
FIG. 2 is a flowchart of a method for prompting navigation information according to an embodiment of the present disclosure.

With further reference to FIG. 2, illustrating a flow 200 of a method for prompting navigation information according to an embodiment of the present disclosure. The method for prompting navigation information may include the following steps.

Step 201, acquiring, when a user is in an underground vehicle area, traffic behavior statuses of an underground vehicle at stops on a preset navigation route.

In the present embodiment, an executing body of the method for prompting navigation information (for example, the server 105 shown in FIG. 1) may acquire the traffic behavior statuses of the underground vehicle at locations of the stops on the preset navigation route when the user is in the underground vehicle area; or, the executing body of the method for prompting navigation information (for example, the terminal device 101, 102, or 103 shown in FIG. 1) may acquire the traffic behavior statuses of the underground vehicle at locations of the stops on the navigation route. The user may be a user of a terminal device (for example, the terminal device 101, 102, or 103 shown in FIG. 1). The underground vehicle area may be an area through which the vehicle travels in an underground traffic scenario.

Here, in an embodiment of the present disclosure, by providing the base stations of the stops on the preset navigation route, for example, providing the base stations within preset ranges of the respective stops, and the preset range may be a radiation coverage of the base station. The preset navigation route may be a route obtained by navigating by the user using a navigation application or a map application on the terminal device in advance. For example, the user may input a destination stop (for example, a stop through which the underground vehicle passes), and then determine a navigation route using a navigation application or a map application based on a starting stop acquired by the base station or a starting stop that the user enters by swiping card (for example, smart IC card (Smart Card), smart terminal device) acquired or a starting stop input by the user. The navigation route may include at least two stops that the underground vehicle passes along the navigation route.

Here, acquiring the traffic behavior statuses of the underground vehicle at locations of the stops, may include: determining the traffic behavior status of the underground vehicle at the stop through a pre-trained status recognition model. The traffic behavior status may be used to represent an operating status of the underground vehicle, for example, entering, exiting, travelling, stopped, or the like.

In an example, the executing body may train the status recognition model based on the following steps: first obtaining traffic behavior data of the underground vehicle at the locations of the stops, as well as the corresponding traffic behavior statuses at the locations of the stops; then, training a machine learning model by using the traffic behavior data and the traffic behavior statuses to obtain the status recognition model. During training, the executing body may use the traffic behavior data as an input of the status recognition model, and use the input corresponding traffic behavior statuses as an expected output to obtain the status recognition model. The above machine learning model may be a probability model, a classification model or other classifiers in the existing technology or future development technology. For example, the machine learning model may include any one of the following: a decision tree model (XGBoost), a logistic regression model (LR), or a deep neural network model (DNN).

In an example, after the traffic behavior data and the traffic behavior statuses are obtained, feature extraction is performed on the traffic behavior data to obtain a traffic behavior feature; then, model training is performed by using the traffic behavior feature and the traffic behavior statuses. The traffic behavior feature may be used to represent a traffic behavior of the underground vehicle.

It should be noted that the traffic behavior feature may be extracted through a pre-trained feature extraction model.

In the technical solution of the present disclosure, the collection, storage, usage, processing, transmission, provision, disclosure and other processing of the location of the base station and traffic operating status involved all comply with relevant laws and regulations, and do not violate public order and good customs.

Step 202, determining, in response to the traffic behavior status of each stop of adjacent stops on the navigation route being consistent with a first preset traffic behavior status, a base station corresponding to a latter stop in the adjacent stops as a reference station.

In the present embodiment, the executing body may determine the base station corresponding to the latter stop in the adjacent stops as the reference station, when the traffic behavior status of each stop of the adjacent stops on the navigation route is consistent with the first preset traffic behavior status.

Figure 3A:
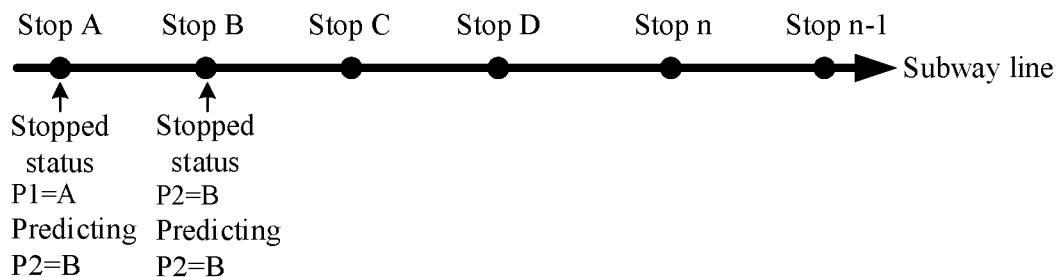
FIG. 3A and FIG. 3B are schematic diagrams of determining a reference station.

In an example, in FIG. 3A, "stop A-stop n" are stops on a navigation route, "stop A" and "stop B" are adjacent stops, an actual traffic behavior status of the subway at "stop A" is a "stopped" status, and the first preset traffic behavior status corresponding to "stop A" is the "stopped" status; at "stop A", it is predicted whether the stop that the subway will arrive at next is "stop B" (for example, predicting P2=stop B), and whether the subway's corresponding traffic behavior status (i.e., preset status) at "stop B" is the "stopped" status; the next time when the location of the base station is acquired, if the stop corresponding to the base station is determined to be "stop B" (i.e., P2=stop B, predicting P2=stop B), the actual traffic behavior status of the subway at "stop B" is the "stopped" status, and the first preset traffic behavior status corresponding to "stop B" is consistent with the "stopped" status; then it indicates that the location of "stop B" predicted based on "stop A" is accurate, and in this regard, the base station corresponding to "stop B" may be used as the reference station.

Correspondingly, in this example, the traffic behavior statuses of the adjacent stops may be used to prove that the locations corresponding to "stop A" and "stop B" measured by their corresponding base stations are accurate; in this regard, "stop B" may serve as the reference station to determine the locations of subsequent stops (e.g., stop C-stop n).

Figure 3B:
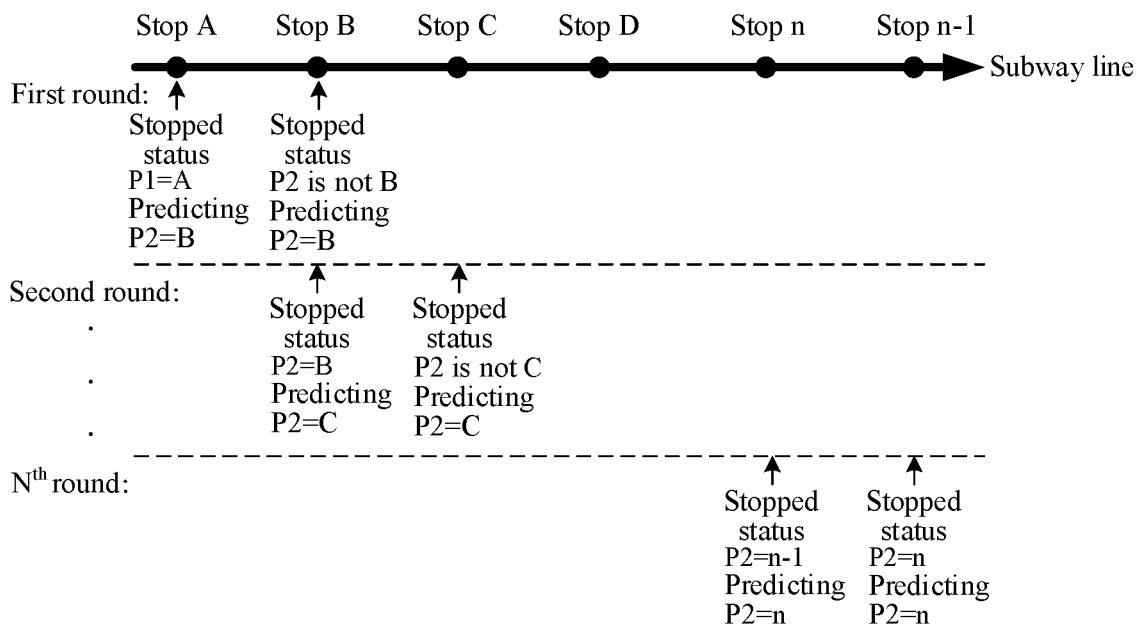

In an example, in FIG. 3B, an actual traffic behavior status of the subway at "stop A" is a "stopped" status, and the first preset traffic behavior status corresponding to "stop A" is the "stopped" status; at "stop A", it is predicted whether the stop that the subway will arrive at next is "stop B" (i.e., predicting P2=stop B), and whether the traffic behavior status corresponding to "stop B" (i.e., first preset traffic behavior status) is the "stopped" status; the next time when the location of the base station is acquired, if it is determined that the stop corresponding to the base station is not "stop B", then the stop corresponding to the current base station is used to predict whether the stop that the subway will arrive at next is "stop C" (i.e., predicting P2=C), and whether the traffic behavior status of the subway at "stop C" is the "stopped" status; the next time when the location of the base station is acquired, if it is determined that the stop corresponding to the base station is "stop C", and the actual traffic behavior status of the subway at "stop C" is the "stopped" status, and the first preset traffic behavior status corresponding to "stop C" is consistent with the "stopped" status; then it indicates that the location of "stop C" predicted based on "the stop corresponding to the current base station" is accurate, and in this regard, the base station corresponding to "stop C" may be used as the reference station.

If it is determined that the stop corresponding to the base station is not "stop C" (that is, P2 is not stop C), then the stop "stop n−1" corresponding to the current base station is used to predict that the stop that the subway will arrive at next is "stop n" (i.e., predicting P2=stop n); the next time when the location of the base station is acquired, if it is determined that the stop corresponding to the base station is "stop n" (i.e., P2=stop n, predicting P2=stop n), and the actual traffic behavior status of the subway at "stop n" is the "stopped" status, and the first preset traffic behavior status corresponding to "stop n" is consistent with the "stopped" status; then it indicates that the location of "stop n" predicted based on "stop n−1" is accurate, and in this regard, the base station corresponding to "stop n" may be used as the reference station.

It should be noted that the above description uses the stopped status (i.e., stop) of the underground vehicle at the next stop and two adjacent stops as an example. In an embodiment of the present disclosure, next several stops (for example, the next two stops of stop B) and adjacent several stops (for example, two stops adjacent to stop B, etc.) may also be used. The specific number of stops may be set based on a length of the navigation route or by default (e.g., next stop).

It should be noted that the first preset traffic behavior status corresponds to the traffic behavior status of each stop in the adjacent stops, and the first preset traffic behavior status corresponding to the traffic behavior status of each stop may be different.

Here, when the traffic behavior statuses of all the stops in the adjacent stops are consistent with the first preset traffic behavior status corresponding to the stops, the base station corresponding to the latter stop in the adjacent stops is determined as the reference station. The above consistency may be that the traffic behavior statuses of all the stops are the same as the first preset traffic behavior status.

That is, the accurate traffic behavior statuses of other stops in the adjacent stops (i.e., all stops except the latter stop) are used to assist in determining the base station corresponding to the latter stop as the reference station. Therefore, the reference station may be used as a reference for determining the locations of subsequent stops on the navigation route.

It should be noted that the adjacent stops may include three stops, in this case, each of the adjacent stops may include three stops, and the latter stop in the adjacent stops may be the second stop or the last stop in the three stops, that is, stops other than the first stop. The latter stop in the adjacent stops may be a stop on the navigation route other than the starting stop and the destination stop. Alternatively, the latter stop in the adjacent stops may be three stops before the destination stop on the navigation route, so that before reaching the destination stop, the reference station may be determined to determine a location of a preset stop (that is, a stop between the reference station and the destination stop, for example, one stop, two stops before the destination stop, or the like) based on a location of the reference station, in order to play the purpose of reminding to get off in advance.

Step 203, determining a location of a preset stop on the navigation route, based on a location of the reference station and locations of base stations provided at the stops.

In the present embodiment, the executing body may determine the location of the preset stop on the navigation route, based on the location of the reference station and the locations of the base stations provided at the stops. The location of the reference station may be used to represent the location of a stop corresponding to the reference station. The location may be a latitude and longitude, a three-dimensional space location, or the like.

In an example, base stations provided at the underground vehicle may be pre-collected. For example, locations of the base stations corresponding to all the stops that the subway passes through; after the reference station is determined, the stop corresponding to the reference station is also determined; then, the location of the preset stop is determined, based on the locations of the base stations corresponding to all the stops that the subway passes through.

For example, using FIG. 3A as an example, "stop B" is the reference station, and the preset stop is "stop n–1"; after determining the reference station (that is, determining the location of "stop B"), the location of "stop n" may be determined based on the locations of the base stations corresponding to "stop A"-"stop n".

It should be noted that the preset stop may be set according to the navigation route, for example, the preset stop is one stop, two stops before the destination stop of the navigation route, or the like.

Step 204, outputting, in response to the traffic behavior status of the underground vehicle at the preset stop being consistent with a second preset traffic behavior status, prompt information for getting off.

In the present embodiment, the executing body may output the prompt information for getting off, when the traffic behavior status of the underground vehicle at the preset stop is consistent with the second preset traffic behavior status.

Here, the executing body may send the prompt information for getting off to the terminal device, so as to remind the user of the terminal device to get off the underground vehicle. The prompt information for getting off may be prompted in a preset method, for example, vibrating the terminal device, highlighting on the terminal device, or issuing a prompt sound through the terminal device, etc.

The method for prompting navigation information provided by an embodiment of the present disclosure, first acquiring, when the user is in the underground vehicle area, traffic behavior statuses of the underground vehicle at stops on the preset navigation route; then determining, in response to the traffic behavior status of each stop of adjacent stops on the navigation route being consistent with the first preset traffic behavior status, a base station corresponding to the latter stop in the adjacent stops as a reference station; then determining a location of a preset stop on the navigation route, based on the location of the reference station and the locations of the base stations provided at the stops; and finally outputting, in response to the traffic behavior status of the underground vehicle at the preset stop being consistent with the second preset traffic behavior status, prompt information for getting off. When the underground vehicle is navigating in an underground traffic scenario, the reference station may be determined based on the traffic behavior status of the underground vehicle; then, based on the location of the reference station and the locations of the base stations provided at the stops on the navigation route, the location of the preset stop may be deduced to output the prompt information for getting off.

With further reference to FIG. 4, illustrating a flow 400 of the method for prompting navigation information according to another embodiment of the present disclosure. The method for prompting navigation information may include the following steps.

Step 401, in response to a location obtained by a terminal device performing network positioning at a target stop of an underground vehicle, matching from pre-collected base stations of the underground vehicle, a base station corresponding to the target stop, and determining that a user is in an underground vehicle area.

In the present embodiment, an executing body of the method for prompting navigation information (for example, the server 105 shown in FIG. 1) may determine that the user is in the underground vehicle area, through the location obtained by the terminal device (for example, the terminal device 101 shown in FIG. 1) performing network positioning at the target stop of the underground vehicle, when the base station corresponding to the target stop is matched from the pre-collected base stations of the underground vehicle based on the location obtained by network positioning.

Here, performing network positioning at the target stop of the underground vehicle by the terminal device, may include: when the user arrives at the target stop of the underground vehicle, and based on network positioning, the base station corresponding to the target stop may be matched from the pre-collected base stations corresponding to the stops of the underground vehicle, it is determined that the user is in the underground vehicle area.

Correspondingly, in this example, the target stop may be a certain stop where the user enters the underground vehicle. The above network positioning may be based on the communication network to determine a location of the target stop, for example, wireless fidelity (WI-FI), the $5^{th}$-generation mobile communication technology (5G), the fourth-generation mobile communication technology (4G), the third generation mobile communication technology (3G), the second generation mobile communication technology (2G) and so on.

In an example, the user needs to take the underground vehicle at the target stop (for example, stop A). In a process of entering the "underground vehicle" through an entry gate of "stop A", the user may use the terminal device (for example, the terminal device 101 shown in FIG. 1) to perform network positioning to determine the location of "stop A"; then, based on the location of "stop A", when a base station corresponding to the target stop is matched from pre-collected base stations corresponding to the stops of the underground vehicle, it is determined that the user entered the underground vehicle area in this regard.

Step 402, acquiring, when the user is in the underground vehicle area, traffic behavior statuses of the underground vehicle at stops on a preset navigation route.

Step 403, determining, in response to the traffic behavior status of each stop of adjacent stops on the navigation route being consistent with a first preset traffic behavior status, a base station corresponding to a latter stop in the adjacent stops as a reference station.

Step 404, determining a location of a preset stop on the navigation route, based on a location of the reference station and locations of the base stations provided at the stops.

Step 405, outputting, in response to the traffic behavior status of the underground vehicle at the preset stop being consistent with a second preset traffic behavior status, prompt information for getting off.

In the present embodiment, the operations of steps 402 to 405 have been described in detail in steps 201 to 204 in the embodiment shown in FIG. 2, and detailed description thereof will be omitted.

As can be seen from FIG. 4, compared with the embodiment corresponding to FIG. 2, the method for prompting navigation information in the present embodiment highlights the step of determining that the user is in the underground vehicle area. Therefore, the solution described in the present embodiment matches the base station corresponding to the target stop from the pre-collected base stations corresponding to the stops of the underground vehicle based on the location obtained by the terminal device performing network positioning at the target stop of the underground vehicle, to determine that the user is in the underground vehicle area. Based on the location obtained by network positioning, the base station corresponding to the target stop may be matched from the pre-collected base stations corresponding to the stops of the underground vehicle, so that it can be accurately determined that the user is in the underground vehicle area.

In some alternative implementations of the present embodiment, the acquiring traffic behavior statuses of the underground vehicle at stops on a preset navigation route, may include: acquiring traffic behavior data of the underground vehicle at the stops on the preset navigation route by using a sensor of the terminal device; and inputting the traffic behavior data at the stops into a pre-trained status recognition model to obtain the traffic behavior statuses at the stops.

In this implementation, the executing body may acquire traffic operation data of the underground vehicle at locations of the stops based on the sensor of the terminal device; then, input the traffic behavior data into the pre-trained status recognition model to determine the traffic behavior statuses of the underground vehicle at the locations of the stops. The traffic operation data may be data related to traffic operation generated by the underground vehicle at the stops on the navigation route, such as running speed, running time, running mode, or the like.

Here, the status recognition model may be a model obtained by training a machine learning model in advance.

Here, the drive test data and a guide arrow sign are used as an input of the status recognition model, and a road access direction is used as an output of the status recognition model, and the machine learning model is trained to obtain the status recognition model.

In an example, the executing body may train the status recognition model based on the following steps: first obtaining the traffic behavior data of the underground vehicle at the locations of the stops, as well as the corresponding traffic behavior statuses at the locations of the stops; then, training a machine learning model by using the traffic behavior data and the traffic behavior statuses to obtain the status recognition model. During training, the executing body may use the traffic behavior data as an input of the status recognition model, and use the input corresponding traffic behavior statuses as an expected output to obtain the status recognition model. The above machine learning model may be a probability model, a classification model or other classifiers in the existing technology or future development technology. For example, the machine learning model may include any one of the following: a decision tree model (XGBoost), a logistic regression model (LR), or a deep neural network model (DNN).

In an example, after the traffic behavior data and the traffic behavior statuses are obtained, feature extraction is performed on the traffic behavior data to obtain a traffic behavior feature; then, model training is performed by using the traffic behavior feature and the traffic behavior statuses. The traffic behavior feature may be used to represent a traffic behavior of the underground vehicle.

It should be noted that the traffic behavior feature may be extracted through a pre-trained feature extraction model.

In this implementation, the executing body may determine the corresponding traffic behavior statuses of the underground vehicle at the stops based on the pre-trained status recognition model and the traffic behavior data of the underground vehicle at the stops acquired by the sensor.

In some alternative implementations of the present embodiment, the adjacent stops are each adjacent stop on the navigation route, and the method for prompting navigation information may further include: in response to a reference station corresponding to a subsequent adjacent stop of each adjacent stop being different from the reference station corresponding to each of the adjacent stops, using the reference station corresponding to the subsequent adjacent stop as a new reference station. The determining a location of a preset stop on the navigation route, based on a location of the reference station and locations of base stations provided at the stops, may include: determining the location of the preset stop on the navigation route, based on a location of the new reference station and the locations of the base stations provided at the stops.

In this implementation, the executing body may determine the reference station corresponding to each adjacent stop based on the traffic behavior status of each adjacent stop and a preset traffic behavior status; in response to the reference station corresponding to the subsequent adjacent stop in the adjacent stops being different from the reference station corresponding to this adjacent stop, use the reference station corresponding to the subsequent adjacent stop as the new reference station; and based on the location of the new reference station and the locations of the base stations provided at the stops, determine the location of the preset stop on the navigation route. The subsequent adjacent stop may be a stop adjacent to each adjacent stop.

In this implementation, the executing body may determine new reference stations for multiple times during the underground vehicle traveling on the navigation route, so as to try to correct the situation that a previously determined reference station is inaccurate in predicting the locations of subsequent stops.

It should be noted that the determination of the new reference station for multiple times may include: determining the reference station every time the location of a base station is acquired; or, re-determining the new reference station according to a preset number of interval stops.

In this implementation, the new reference station may be re-determined multiple times so that the location of the preset stop determined based on the new reference station is accurate.

In some alternative implementations of the present embodiment, the sensor includes at least one of: an acceleration sensor, a gyroscope sensor or a gravity sensor.

In this implementation, the sensor may include at least one of: the acceleration sensor, the gyroscope sensor or the gravity sensor, and the sensor may be used to acquire the traffic behavior data of the underground vehicle at the locations of the stops.

In some alternative implementations of the present embodiment, the traffic behavior status includes at least one of: entering, exiting, traveling, or stopped.

In this implementation, the traffic behavior status may include at least one of: entering, exiting, traveling, or stopped.

In this implementation, the reference station may be determined through the above traffic behavior status.

Figure 5:
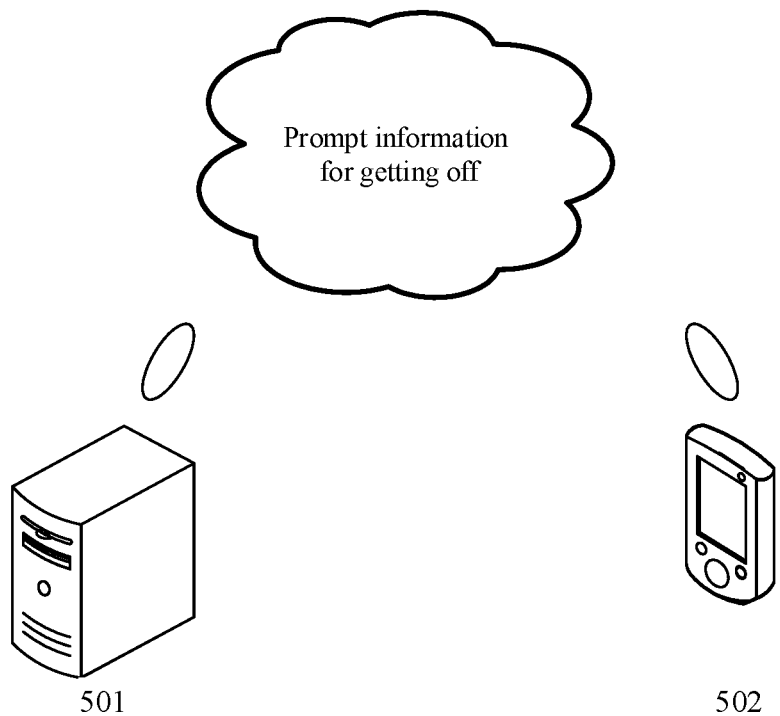
FIG. 5 is a schematic diagram of an application scenario of the method for prompting navigation information according to an embodiment of the present disclosure.

With further reference to FIG. 5, FIG. 5 shows a schematic diagram of an application scenario of the method for prompting navigation information according to the present disclosure. In this application scenario, when a user is in an underground vehicle area, a terminal device (such as the terminal device 101 shown in FIG. 1) 502 is used to acquire traffic behavior statuses of an underground vehicle at locations of stops; then, send the locations of the stops and the traffic behavior statuses at the locations of the stops to a server (for example, the server 105 shown in FIG. 1) 501; then, the server 501 determines a base station corresponding to a latter stop in adjacent stops as a reference station, when the traffic behavior status of each stop in the adjacent stops on a navigation route is consistent with a first preset traffic behavior status; the server 501 determines a location of a preset stop on the navigation route based on a location of the reference station and locations of base stations provided at the stops; when the traffic behavior status of the underground vehicle at the preset stop is consistent with a second preset traffic behavior status, the server 501 outputs prompt information for getting off; after that, the prompt information is sent to the terminal device 502 to remind the user of the terminal device to be prepared to get off the underground vehicle.

Figure 6:
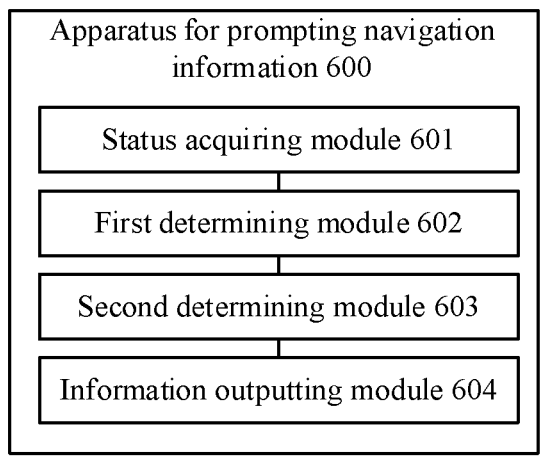
FIG. 6 is a schematic structural diagram of an apparatus for prompting navigation information according to an embodiment of the present disclosure.

With further reference to FIG. 6, as an implementation of the method shown in the above figures, an embodiment of the present disclosure provides an apparatus for prompting navigation information. The embodiment of the apparatus corresponds to the embodiment of the method shown in FIG. 2, and the apparatus is particularly applicable to various electronic devices.

As shown in FIG. 6, the apparatus 600 for prompting navigation information of the present embodiment may include: a status acquiring module 601, a first determining module 602, a second determining module 603 and an information outputting module 604. The status acquiring module 601 is configured to acquire, when a user is in an underground vehicle area, traffic behavior statuses of an underground vehicle at stops on a preset navigation route. The first determining module 602 is configured to determine, in response to the traffic behavior status of each stop of adjacent stops on the navigation route being consistent with a first preset traffic behavior status, a base station corresponding to a latter stop in the adjacent stops as a reference station. The second determining module 603 is configured to determine a location of a preset stop on the navigation route, based on a location of the reference station and locations of base stations provided at the stops. The information outputting module 604 is configured to output, in response to the traffic behavior status of the underground vehicle at the preset stop being consistent with a second preset traffic behavior status, prompt information for getting off.

In the present embodiment, in the apparatus 600 for prompting navigation information: for the specific processing and the technical effects of the status acquiring module 601, the first determining module 602, the second determining module 603 and the information outputting module 604, reference may be made to the relevant descriptions of steps 201-204 in the corresponding embodiment of FIG. 2, respectively, and detailed description thereof will be omitted.

In some alternative implementations of the present embodiment, the status acquiring module 601 is further configured to: in response to a location obtained by a terminal device performing network positioning at a target stop of the underground vehicle, match from pre-collected base stations corresponding to the stops of the underground vehicle, a base station corresponding to the target stop, and determine that the user is in the underground vehicle area.

In some alternative implementations of the present embodiment, the status acquiring module 601 is further configured to: acquire traffic behavior data of the underground vehicle at the stops on the preset navigation route by using a sensor of the terminal device; and input the traffic behavior data at the stops into a pre-trained status recognition model to obtain the traffic behavior statuses at the stops.

In some alternative implementations of the present embodiment, the adjacent stops are each adjacent stop on the navigation route, and the apparatus for prompting navigation information further includes: a reference station using module, configured to, in response to a reference station corresponding to a subsequent adjacent stop of each adjacent stop being different from the reference station corresponding to each of the adjacent stops, use the reference station corresponding to the subsequent adjacent stop as a new reference station; and the second determining module 603 is further configured to: determine the location of the preset stop on the navigation route, based on a location of the new reference station and the locations of the base stations provided at the stops.

In some alternative implementations of the present embodiment, the sensor includes at least one of: an acceleration sensor, a gyroscope sensor or a gravity sensor.

In some alternative implementations of the present embodiment, the traffic behavior status includes at least one of: entering, exiting, traveling, or stopped.

According to an embodiment of the present disclosure, the present disclosure also provides an electronic device, a readable storage medium, and a computer program product.

Figure 7:
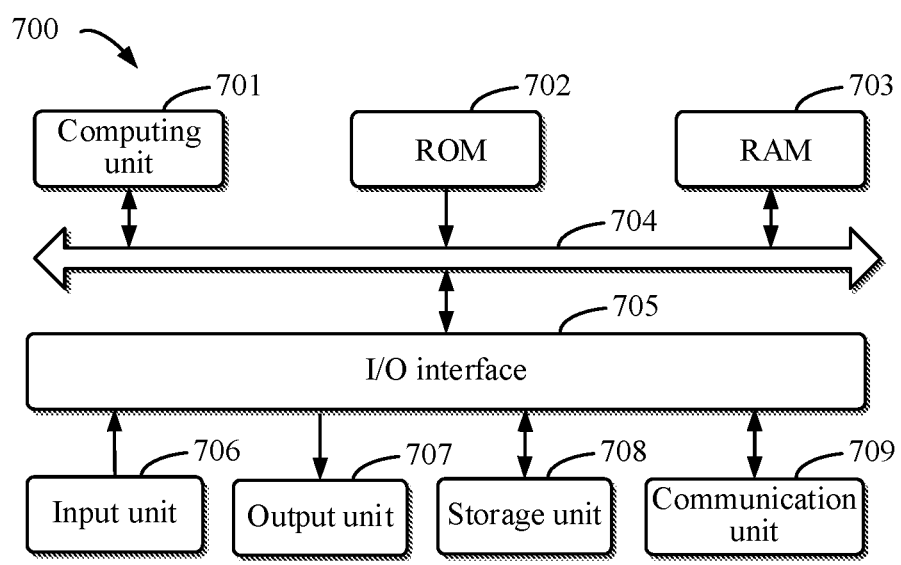
FIG. 7 is a block diagram of an electronic device used to implement embodiments of the present disclosure.

FIG. 7 illustrates a schematic block diagram of an example electronic device 700 for implementing the embodiments of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 7, the device 700 includes a computing unit 701, which may perform various appropriate actions and processing, based on a computer program stored in a read-only memory (ROM) 702 or a computer program loaded from a storage unit 708 into a random access memory (RAM) 703. In the RAM 703, various programs and data required for the operation of the device 700 may also be stored. The computing unit 701, the ROM 702, and the RAM 703 are connected to each other through a bus 704. An input/output (I/O) interface 705 is also connected to the bus 704.

A plurality of parts in the device 700 are connected to the I/O interface 705, including: an input unit 706, for example, a keyboard and a mouse; an output unit 707, for example, various types of displays and speakers; the storage unit 708, for example, a disk and an optical disk; and a communication unit 709, for example, a network card, a modem, or a wireless communication transceiver. The communication unit 709 allows the device 700 to exchange information/data with other devices over a computer network such as the Internet and/or various telecommunication networks.

The computing unit 701 may be various general-purpose and/or dedicated processing components having processing and computing capabilities. Some examples of the computing unit 701 include, but are not limited to, central processing unit (CPU), graphics processing unit (GPU), various dedicated artificial intelligence (AI) computing chips, various computing units running machine learning model algorithms, digital signal processors (DSP), and any appropriate processors, controllers, microcontrollers, etc. The computing unit 701 performs the various methods and processes described above, such as the method for prompting navigation information. For example, in some embodiments, the method for prompting navigation information may be implemented as a computer software program, which is tangibly included in a machine readable medium, such as the storage unit 708. In some embodiments, part or all of the computer program may be loaded and/or installed on the device 700 via the ROM 702 and/or the communication unit 709. When the computer program is loaded into the RAM 703 and executed by the computing unit 701, one or more steps of the method for prompting navigation information described above may be performed. Alternatively, in other embodiments, the computing unit 701 may be configured to perform the method for prompting navigation information by any other appropriate means (for example, by means of firmware).

The various implementations of the systems and technologies described herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software and/or combinations thereof. The various implementations may include: being implemented in one or more computer programs, where the one or more computer programs may be executed and/or interpreted on a programmable system including at least one programmable processor, and the programmable processor may be a particular-purpose or general-purpose programmable processor, which may receive data and instructions from a storage system, at least one input device and at least one output device, and send the data and instructions to the storage system, the at least one input device and the at least one output device.

Program codes used to implement the method of embodiments of the present disclosure may be written in any combination of one or more programming languages. These program codes may be provided to a processor or controller of a general-purpose computer, particular-purpose computer or other programmable data processing apparatus, so that the program codes, when executed by the processor or the controller, cause the functions or operations specified in the flowcharts and/or block diagrams to be implemented. These program codes may be executed entirely on a machine, partly on the machine, partly on the machine as a stand-alone software package and partly on a remote machine, or entirely on the remote machine or a server.

In the context of the present disclosure, the machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. A more particular example of the machine-readable storage medium may include an electronic connection based on one or more lines, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

To provide interaction with a user, the systems and technologies described herein may be implemented on a computer having: a display device (such as a CRT (cathode ray tube) or LCD (liquid crystal display) monitor) for displaying information to the user; and a keyboard and a pointing device (such as a mouse or a trackball) through which the user may provide input to the computer. Other types of devices may also be used to provide interaction with the user. For example, the feedback provided to the user may be any form of sensory feedback (such as visual feedback, auditory feedback or tactile feedback); and input from the user may be received in any form, including acoustic input, speech input or tactile input.

The systems and technologies described herein may be implemented in: a computing system including a background component (such as a data server), or a computing system including a middleware component (such as an application server), or a computing system including a front-end component (such as a user computer having a graphical user interface or a web browser through which the user may interact with the implementations of the systems and technologies described herein), or a computing system including any combination of such background component, middleware component or front-end component. The components of the systems may be interconnected by any form or medium of digital data communication (such as a communication network). Examples of the communication network include a local area network (LAN), a wide area network (WAN), and the Internet.

A computer system may include a client and a server. The client and the server are generally remote from each other, and generally interact with each other through the communication network. A relationship between the client and the server is generated by computer programs running on a corresponding computer and having a client-server relationship with each other. The server may be a cloud server, a distributed system server, or a server combined with a blockchain.

Artificial intelligence is a discipline that studies computers to simulate certain thinking processes and intelligent behaviors of humans (such as learning, reasoning, thinking, planning). There are both hardware-level technologies and software-level technologies. There are both hardware-level technologies and software-level technologies. Artificial intelligence hardware technologies generally include technologies such as sensors, dedicated artificial intelligence chips, cloud computing, distributed storage, and big data processing; and artificial intelligence software technologies mainly include computer vision technology, speech recognition technology, natural speech processing technology, and machine learning/depth learning, big data processing technology, knowledge graph technology and other major directions.

It should be appreciated that the steps of reordering, adding or deleting may be executed using the various forms shown above. For example, the steps described in embodiments of the present disclosure may be executed in parallel or sequentially or in a different order, so long as the expected results of the technical schemas provided in embodiments of the present disclosure may be realized, and no limitation is imposed herein.

The above particular implementations are not intended to limit the scope of the present disclosure. It should be appreciated by those skilled in the art that various modifications, combinations, sub-combinations, and substitutions may be made depending on design requirements and other factors. Any modification, equivalent and modification that fall within the spirit and principles of the present disclosure are intended to be included within the scope of the present disclosure.

What is claimed is:

1. A method for prompting navigation information, the method comprising:
   acquiring, when a user is in an underground vehicle area, traffic behavior statuses of an underground vehicle at stops on a preset navigation route;
   determining, in response to the traffic behavior status of each stop of adjacent stops on the navigation route being consistent with a first preset traffic behavior status, a communication base station provided within a preset range of a latter stop in the adjacent stops as a reference station, the preset range corresponding to a radiation coverage of the communication base station, wherein the reference station is used as a reference for determining locations of subsequent stops on the navigation route, wherein the determining comprises:
      in response to that the traffic behavior status of a first stop in the adjacent stops on the navigation route is consistent with the first preset traffic behavior status, and that a next time when a location of a target communication base station is acquired, determining a stop within a radiation coverage of the target communication base station to be the latter stop in the adjacent stops, and
      in response to the traffic behavior status of the latter stop is consistent with the first preset traffic behavior status, determining the target communication base station as the reference station;
   determining a location of a preset stop on the navigation route, based on a location of the reference station and locations of communication base stations provided at the stops; and
   outputting, in response to the traffic behavior status of the underground vehicle at the preset stop being consistent with a second preset traffic behavior status, prompt information for getting off.

2. The method according to claim 1, wherein, the user is in the underground vehicle area, comprises:
   in response to a location obtained by a terminal device performing network positioning at a target stop of the underground vehicle, matching from pre-collected communication base stations corresponding to the stops of the underground vehicle, a communication base station corresponding to the target stop, and determining that the user is in the underground vehicle area.

3. The method according to claim 1, wherein acquiring traffic behavior statuses of the underground vehicle at stops on the preset navigation route, comprises:
   acquiring traffic behavior data of the underground vehicle at the stops on the preset navigation route by using a sensor of a terminal device; and
   inputting the traffic behavior data at the stops into a pre-trained status recognition model to obtain the traffic behavior statuses at the stops.

4. The method according to claim 3, wherein the sensor comprises at least one of: an acceleration sensor, a gyroscope sensor, or a gravity sensor.

5. The method according to claim 1, wherein, the adjacent stops are each adjacent stop on the navigation route, and the method further comprises:
   in response to a reference station corresponding to a subsequent adjacent stop of each adjacent stop being different from the reference station corresponding to each of the adjacent stops, using the reference station corresponding to the subsequent adjacent stop as a new reference station; and
   wherein determining the location of the preset stop on the navigation route, based on the location of the reference station and locations of communication base stations provided at the stops, comprises:
   determining the location of the preset stop on the navigation route, based on a location of the new reference station and the locations of the communication base stations provided at the stops.

6. The method according to claim 1, wherein the traffic behavior status comprises at least one of: entering, exiting, traveling, or stopped.

7. An electronic device, comprising:
   at least one processor; and
   a memory communicatively connected to the at least one processor;
   wherein the memory stores instructions executable by the at least one processor, and the instructions, when executed by the at least one processor, cause the at least one processor to perform operations:
   acquiring, when a user is in an underground vehicle area, traffic behavior statuses of an underground vehicle at stops on a preset navigation route;
   determining, in response to the traffic behavior status of each stop of adjacent stops on the navigation route being consistent with a first preset traffic behavior status, a communication base station provided within a preset range of a latter stop in the adjacent stops as a reference station, the preset range corresponding to a radiation coverage of the communication base station, wherein the reference station is used as a reference for determining locations of subsequent stops on the navigation route, wherein the determining comprises:
      in response to that the traffic behavior status of a first stop in the adjacent stops on the navigation route is consistent with the first preset traffic behavior status, and that a next time when a location of a target communication base station is acquired, determining a stop within a radiation coverage of the target communication base station to be the latter stop in the adjacent stops, and
      in response to the traffic behavior status of the latter stop is consistent with the first preset traffic behavior status, determining the target communication base station as the reference station;

determining a location of a preset stop on the navigation route, based on a location of the reference station and locations of communication base stations provided at the stops; and outputting, in response to the traffic behavior status of the underground vehicle at the preset stop being consistent with a second preset traffic behavior status, prompt information for getting off.

8. The electronic device according to claim 7, wherein, the user is in the underground vehicle area, comprises:

in response to a location obtained by a terminal device performing network positioning at a target stop of the underground vehicle, matching from pre-collected communication base stations corresponding to the stops of the underground vehicle, a communication base station corresponding to the target stop, and determining that the user is in the underground vehicle area.

9. The electronic device according to claim 7, wherein acquiring traffic behavior statuses of the underground vehicle at stops on the preset navigation route, comprises:

acquiring traffic behavior data of the underground vehicle at the stops on the preset navigation route by using a sensor of a terminal device; and inputting the traffic behavior data at the stops into a pre-trained status recognition model to obtain the traffic behavior statuses at the stops.

10. The electronic device according to claim 7, wherein, the adjacent stops are each adjacent stop on the navigation route, and the electronic device further comprises:

in response to a reference station corresponding to a subsequent adjacent stop of each adjacent stop being different from the reference station corresponding to each of the adjacent stops, using the reference station corresponding to the subsequent adjacent stop as a new reference station; and wherein determining the location of the preset stop on the navigation route, based on the location of the reference station and locations of communication base stations provided at the stops, comprises:

determining the location of the preset stop on the navigation route, based on a location of the new reference station and the locations of the communication base stations provided at the stops.

11. The electronic device according to claim 9, wherein the sensor comprises at least one of: an acceleration sensor, a gyroscope sensor, or a gravity sensor.

12. The electronic device according to claim 7, wherein the traffic behavior status comprises at least one of: entering, exiting, traveling, or stopped.

13. A non-transitory computer readable storage medium storing computer instructions, wherein, the computer instructions, when executed by at least one processor, cause the at least one processor to perform operations:

acquiring, when a user is in an underground vehicle area, traffic behavior statuses of an underground vehicle at stops on a preset navigation route;

determining, in response to the traffic behavior status of each stop of adjacent stops on the navigation route being consistent with a first preset traffic behavior status, a communication base station provided within a preset range of a latter stop in the adjacent stops as a reference station, the preset range corresponding to a radiation coverage of the communication base station, wherein the reference station is used as a reference for determining locations of subsequent stops on the navigation route, wherein the determining comprises:

in response to that the traffic behavior status of a first stop in the adjacent stops on the navigation route is consistent with the first preset traffic behavior status, and that a next time when a location of a target communication base station is acquired, determining a stop within a radiation coverage of the target communication base station to be the latter stop in the adjacent stops, and in response to the traffic behavior status of the latter stop is consistent with the first preset traffic behavior status, determining the target communication base station as the reference station;

determining a location of a preset stop on the navigation route, based on a location of the reference station and locations of communication base stations provided at the stops; and outputting, in response to the traffic behavior status of the underground vehicle at the preset stop being consistent with a second preset traffic behavior status, prompt information for getting off.

14. The non-transitory computer readable storage medium according to claim 13, wherein, the user is in the underground vehicle area, comprises:

in response to a location obtained by a terminal device performing network positioning at a target stop of the underground vehicle, matching from pre-collected communication base stations corresponding to the stops of the underground vehicle, a communication base station corresponding to the target stop, and determining that the user is in the underground vehicle area.

15. The non-transitory computer readable storage medium according to claim 13, wherein acquiring traffic behavior statuses of the underground vehicle at stops on the preset navigation route, comprises:

acquiring traffic behavior data of the underground vehicle at the stops on the preset navigation route by using a sensor of a terminal device; and inputting the traffic behavior data at the stops into a pre-trained status recognition model to obtain the traffic behavior statuses at the stops.

16. The non-transitory computer readable storage medium according to claim 15, wherein the sensor comprises at least one of: an acceleration sensor, a gyroscope sensor, or a gravity sensor.

17. The non-transitory computer readable storage medium according to claim 13, wherein, the adjacent stops are each adjacent stop on the navigation route, and the non-transitory computer readable storage medium further comprises:

in response to a reference station corresponding to a subsequent adjacent stop of each adjacent stop being different from the reference station corresponding to each of the adjacent stops, using the reference station corresponding to the subsequent adjacent stop as a new reference station; and wherein determining the location of the preset stop on the navigation route, based on the location of the reference station and locations of communication base stations provided at the stops, comprises:

determining the location of the preset stop on the navigation route, based on a location of the new reference station and the locations of the communication base stations provided at the stops.

18. The non-transitory computer readable storage medium according to claim 13, wherein the traffic behavior status comprises at least one of: entering, exiting, traveling, or stopped.

* * * * *